US012669839B2

(12) United States Patent
Lu et al.

(10) Patent No.: US 12,669,839 B2
(45) Date of Patent: Jun. 30, 2026

(54) DEVICE AND METHOD FOR GENERATING A TEMPERATURE-INDEPENDENT REFERENCE VOLTAGE

(71) Applicant: Taiwan Semiconductor Manufacturing Company, Ltd., Hsinchu (TW)

(72) Inventors: Yi Chen Lu, Hsinchu (TW); Bei-Shing Lien, Hsinchu (TW); Szu-Lin Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 35 days.

(21) Appl. No.: 18/678,164

(22) Filed: May 30, 2024

(65) Prior Publication Data

US 2025/0370491 A1 Dec. 4, 2025

(51) Int. Cl.
*G05F 3/26* (2006.01)
*G05F 1/567* (2006.01)

(52) U.S. Cl.
CPC .............. *G05F 1/567* (2013.01); *G05F 3/262* (2013.01)

(58) Field of Classification Search
None
See application file for complete search history.

(56) References Cited

U.S. PATENT DOCUMENTS 6,049,244 A * 4/2000 Milanesi ................. G05F 3/242 327/512
6,462,527 B1 * 10/2002 Maneatis .................. H03L 7/18 323/315
6,919,753 B2 * 7/2005 Wang ...................... G05F 3/245 327/543
7,652,520 B2 * 1/2010 Gatta ..................... H10D 84/83 327/581
10,345,846 B1 * 7/2019 Bartling .................. G05F 3/247
10,466,731 B2 * 11/2019 Lin ...................... H10D 62/117
11,614,763 B1 3/2023 Bhatta et al.
11,675,383 B2 * 6/2023 Wang ...................... G05F 3/262 323/313
2022/0171419 A1 6/2022 Liao et al.
2024/0007066 A1 1/2024 Coleman
2025/0224753 A1 * 7/2025 Pinchback .............. G05F 3/267

FOREIGN PATENT DOCUMENTS

TW 202223582 A 6/2022
TW 202344946 A 11/2023

OTHER PUBLICATIONS

Taiwan Office Action; Application No. 113126686; Dated May 14, 2025.

* cited by examiner

*Primary Examiner* — Thomas J. Hiltunen
(74) *Attorney, Agent, or Firm* — Jones Day

(57) ABSTRACT

A voltage generator includes a temperature-dependent voltage generator and a reference voltage node. The temperature-dependent voltage generator generates a voltage that increases with temperature and includes a first transistor stack and a second transistor stack, each of which has a first source/drain terminal and a gate terminal connected to each other at a temperature-dependent voltage generator node. The reference voltage node is connected to the temperature-dependent voltage generator and provides a reference voltage substantially independent of temperature. A method for generating the temperature-independent reference voltage is also disclosed.

20 Claims, 9 Drawing Sheets

DEVICE AND METHOD FOR GENERATING A TEMPERATURE-INDEPENDENT REFERENCE VOLTAGE

BACKGROUND

A reference voltage that remains constant regardless of changes in temperature is desirable in many devices, where a stable voltage enables most accurate operations. If a reference voltage were to vary with temperature, it could introduce errors or instability in the device's performance. Having a temperature-independent reference voltage can enable more consistent and reliable operation of the device across different environmental conditions. Such a reference voltage can help maintain accuracy and stability in various applications, such as analog-to-digital converters, voltage regulators, sensor interfaces, and other circuitry where precise voltage references are beneficial.

BRIEF DESCRIPTION OF THE DRAWINGS

Aspects of the present disclosure are best understood from the following detailed description when read with the accompanying figures.

DETAILED DESCRIPTION

Figure 1:
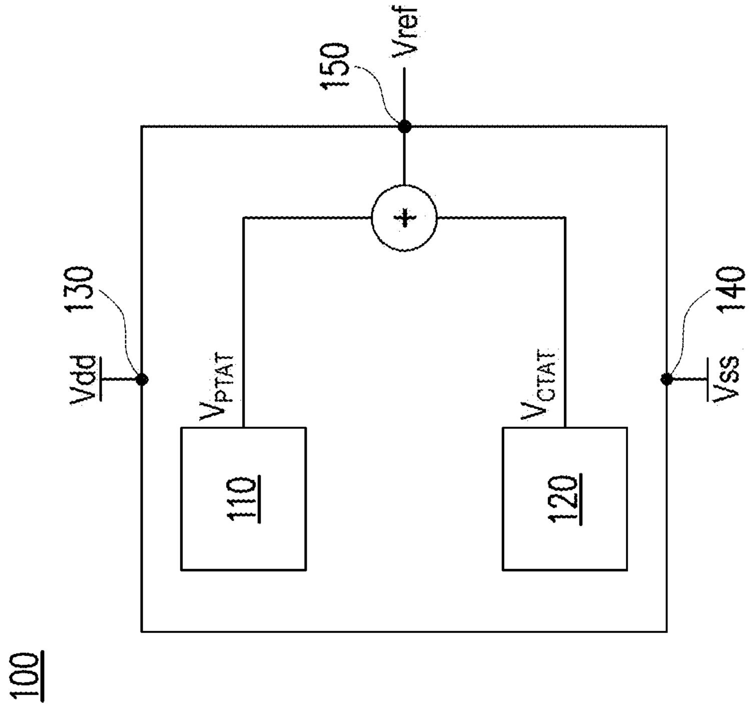
FIG. 1 is a schematic block diagram illustrating an exemplary semiconductor device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A reference voltage that has a zero (or near zero) temperature coefficient or that is independent of temperature is advantageous for devices that benefit from a stable voltage, as that reference voltage remains constant despite temperature changes. This can assist in providing accuracy and stability in various devices like analog-to-digital converters, voltage regulators, and sensor interfaces. A temperature-independent reference voltage may be generated using a temperature-dependent voltage generator that generates a voltage that is dependent of, i.e., that can vary with, temperature. In some instances, the temperature-dependent voltage may be a proportional to absolute temperature (PTAT) voltage that has a positive temperature coefficient and that increases with increasing temperature or a complementary to absolute temperature (CTAT) voltage that has a negative temperature coefficient and that decreases as temperature rises. In some instances, temperature-dependent voltage generators are implemented with bipolar junction transistors (BJTs) and/or a combination of transistors having different voltage thresholds, e.g., standard voltage threshold (SVT), low voltage threshold (LVT), high voltage threshold (HVT), ultra-low voltage threshold (ULVT), ultra-high voltage threshold (UHVT). Implementations where a combination of differing transistors are used can result in inconsistent performance, i.e., in a 3-sigma accuracy of 10% to 15%.

Systems and methods as described in certain examples herein include a temperature-dependent voltage generator, e.g., temperature-dependent voltage generator 110 of FIG. 1, implemented with transistors, e.g., field-effect transistors (FET), having substantially the same voltage threshold and without using BJTs, and temperature-independent voltage generators based thereon, which can result in a 3-sigma accuracy of less than 5%. For example, the temperature-dependent voltage generator 110 comprises one or more transistor stacks, e.g., transistor stack (M1') of FIG. 3 in accordance with an embodiment, each having a predetermined number of transistors connected in series. In further detail, FIG. 1 is a schematic block diagram illustrating an exemplary semiconductor device 100 in accordance with various embodiments of the present disclosure.

As illustrated in FIG. 1, the semiconductor device 100, e.g., a voltage generator, is in the form of a bandgap circuit and includes a first temperature-dependent voltage generator 110 and a second temperature-dependent voltage generator 120. The semiconductor device 100 is connected across a first supply voltage node 130 that receives a first supply voltage (Vdd) and a second supply voltage node 140, e.g., an electrical ground, that receives a second supply voltage (Vss), e.g., 0 Volts, lower than the first supply voltage (Vdd).

The first temperature-dependent voltage generator 110 includes a proportional to absolute temperature (PTAT) circuit and generates a PTAT voltage ($V_{PTAT}$) that has a positive temperature coefficient and that increases with temperature. The second temperature-dependent voltage generator 120 includes a complementary to absolute temperature (CTAT) circuit and generates a CTAT voltage ($V_{CTAT}$) that is inversely proportional to temperature and that decreases as the temperature rises. The semiconductor device 100 generates a temperature-independent reference voltage (Vref) at reference voltage node 150 based on the PTAT voltage ($V_{PTAT}$) and the CTAT voltage ($V_{CTAT}$) (e.g., by combining those values) to produce, in some examples, a reference voltage, e.g., about 0.1V to about 0.5V, that is substantially zero temperature coefficient, e.g., less than 100 ppm/° C.

Figure 2:
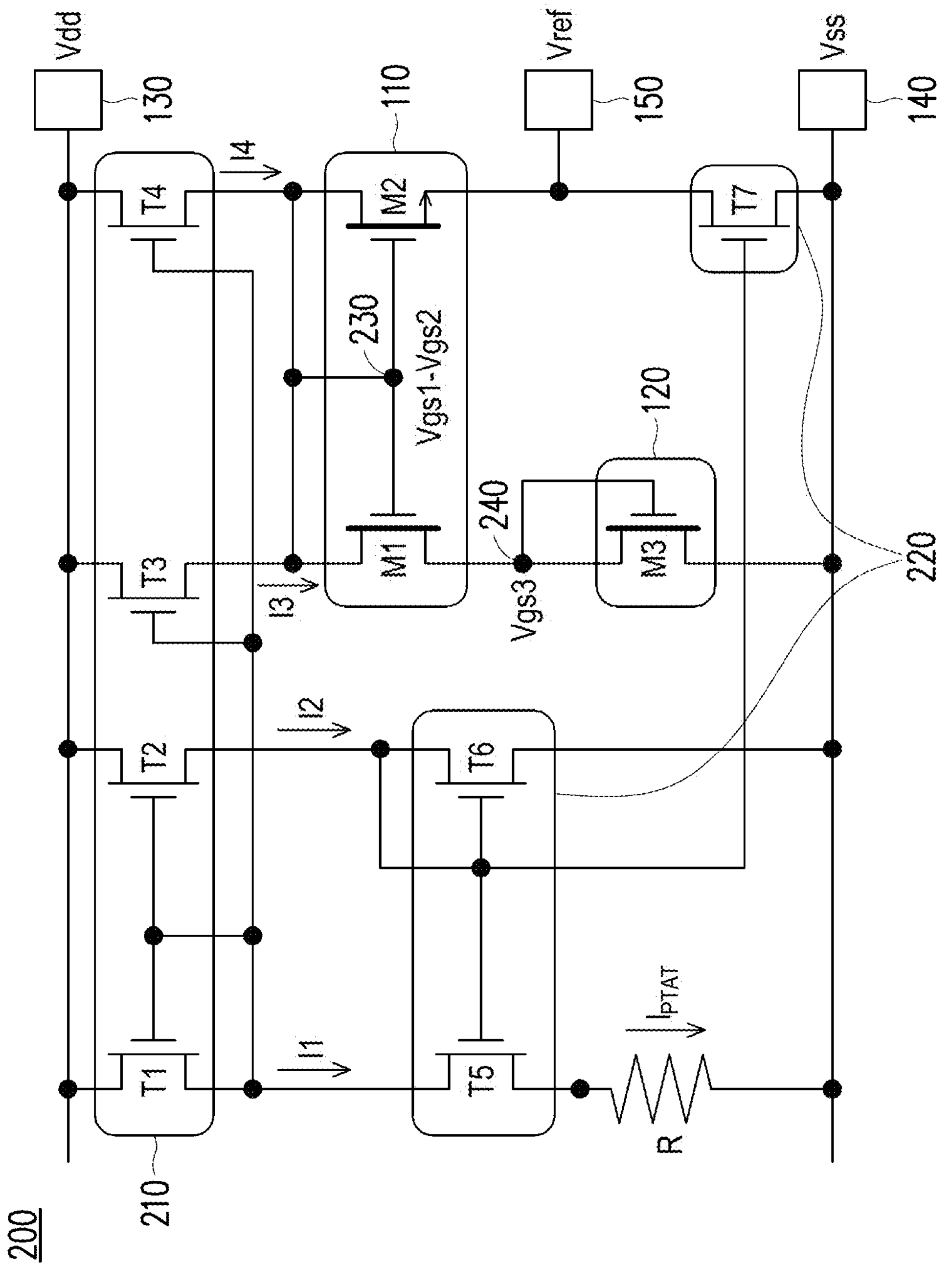
FIG. 2 is a schematic circuit diagram illustrating another exemplary semiconductor device in accordance with various embodiments of the present disclosure.

Example supporting circuitry for the semiconductor device 100 is depicted in FIG. 2. It is understood that this circuitry is provided by way of example, not by limitation, and other suitable semiconductor device 100 circuitry are within the scope of the present disclosure. FIG. 2 is a schematic circuit diagram illustrating another exemplary semiconductor device 200 in accordance with various embodiments of the present disclosure. As illustrated in FIG. 2, the semiconductor device 200 is connected between first and second supply voltage (Vdd, Vss) nodes 130, 140 and includes a first current mirror circuit 210, a second current mirror circuit 220, a first temperature-dependent voltage generator 110, a resistor (R), and a second temperature-dependent voltage generator 120. The first current mirror circuit 210 includes a plurality of transistors (T1-T4), e.g., field-effect transistors (FETs), each having source, drain, and gate terminals. The source terminals of the transistors (T1-T4) are connected to each other at the first supply voltage (Vdd) node 130. The gate terminals of transistors (T1-T4) are connected to each other and to the drain terminal of the transistor (T1).

The second current mirror circuit 220 includes a plurality of transistors (T5-T7), e.g., FETs, each having source, drain, and gate terminals. The drain terminal of the transistor (T5) is connected to the drain terminal of the transistor (T1). The gate and drain terminals of the transistor (T6) are connected to each other and to the gate terminal of the transistor (T5) and the drain terminal of the transistor (T2). The source terminal of the transistor (T6) is connected to the second supply voltage (Vss) node 140. The gate terminal of the transistor (T7) is connected to the gate terminal of the transistor (T5). The source terminal of the transistor (T7) is connected to the reference voltage (Vref) node 150. The source terminal of the transistor (T7) is connected to the second supply voltage (Vss) node 140.

The first temperature-dependent voltage generator 110 is in the form of a PTAT circuit, generates a PTAT voltage, and includes first and second transistor modules (M1, M2), e.g., FET modules, each having source, drain, and gate terminals. The gate and drain terminals of the first transistor module (M1) are connected to each other at a PTAT node 230 and to the drain terminal of the transistor (T3). The gate and drain terminals of the second transistor module (M2) are connected to each other at the PTAT node 230 and to the drain terminal of the transistor (T4). The source terminal of the second transistor module (M2) is connected to the reference voltage (Vref) node 150.

The resistor (R) is connected between the source terminal of the transistor (T5) and the second supply voltage (Vss) node 140.

The second temperature-dependent voltage generator 120 is in the form of a CTAT circuit, generates a CTAT voltage, and includes a third transistor module (M3), e.g., an FET module, having source, drain, and gate terminals. The gate and drain terminals of the third transistor module (M3) are connected to each other at a CTAT node 240 and to the source terminal of the first transistor module (M1). The source terminal of the third transistor module (M3) is connected to the second supply voltage (Vss) node 140.

In an exemplary operation, the semiconductor device 200 receives the first and second supply voltages (Vdd, Vss). Consequently, the transistors (T1-T4) generate mirror currents (I1-I4) that are proportional to each other and that flow through the transistors (T5, T6) and the first and second transistor modules (M1, M2), respectively. In this exemplary embodiment, the transistors (T1-T4) have substantially the same property, such as W/L ratio, and thus the mirror currents (I1-I4) are substantially equal to each other.

Subsequently, the transistors (T5-T7) generate mirror currents that are proportional to each other, that flow therethrough, respectively, and that, in this exemplary embodiment, are substantially equal to each other. At this time, a PTAT current flows through the resistor (R). Next, each temperature-dependent voltage generator 120, 130 generates the respective voltage ($V_{PTAT}$, $V_{CTAT}$. Then, a first gate-to-source voltage (Vgs1-Vgs2) substantially equal to the difference between a gate-to-source voltage (Vgs1) of the first transistor module (M1) and a gate-to-source voltage (Vgs2) of the second transistor module (M2) appears at the PTAT node 230. At substantially the same time, a second voltage gate-to-source voltage (Vgs3) of the third transistor module (M3) appears at the CTAT node 240. Thereafter, a temperature-independent reference voltage (Vref), e.g., substantially equals to the sum of the first gate-to-source voltage (Vgs1-Vgs2) and the second gate-to-source voltage (Vgs3), is established at the reference voltage (Vref) node 150.

Figure 3:
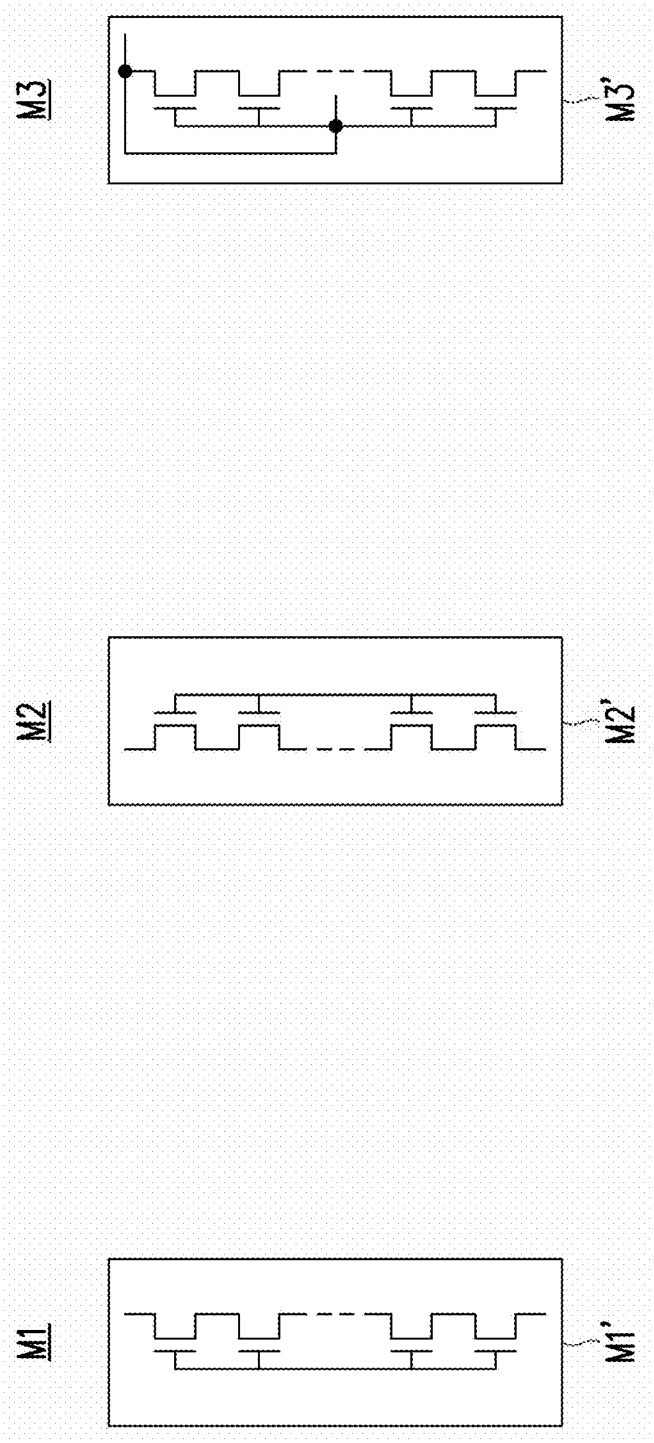
FIG. 3 is a schematic circuit diagram illustrating an exemplary transistor module of a semiconductor device in accordance with various embodiments of the present disclosure.

FIG. 3 is a schematic circuit diagram illustrating an exemplary transistor module (M1, M2, M3) of the semiconductor device 200 in accordance with various embodiments of the present disclosure. As illustrated in FIG. 3, the example transistor module (M1, M2, M3) includes a transistor stack (M1', M2', M3'). The transistor stack (M1') includes a predetermined number of transistors, e.g., FETs, connected in series and each having source, drain, and gate terminals, connected in series. That is, the drain of the first transistor in the transistor stack (M1') serves as the drain terminal of the transistor module (M1). Moreover, the source terminal of the last transistor in the transistor stack (M1') serves as the source terminal of the transistor module (M1). In addition, the source terminal of each transistor in the transistor stack (M1') is connected to the drain terminal of the next transistor in the transistor stack (M1'). The gate terminals of the transistors of the transistor stack (M1') are connected to each other.

Likewise, the transistor stack (M2') includes a predetermined number of transistors, e.g., FETs, connected in series and each having source, drain, and gate terminals. That is, the drain of the first transistor in the transistor stack (M2') serves as the drain terminal of the transistor module (M2). Similarly, the source terminal of the last transistor in the transistor stack (M2') serves as the source terminal of the transistor module (M2). In addition, the source terminal of each transistor in the transistor stack (M2') is connected to the drain terminal of the next transistor in the transistor stack (M2'). The gate terminals of the transistors of the transistor stack (M2') are connected to each other.

In this exemplary embodiment, the number of the transistors of the transistor stack (M1') is greater than the number of the transistors of the transistor stack (M2'). In other words, the transistor module (M1) has a longer channel length than the transistor module (M2).

Similarly, the transistor stack (M3') includes a plurality of transistors, e.g., FETs, connected in series and each having source, drain, and gate terminals. That is, the drain of the first transistor in the transistor stack (M3') serves as the drain terminal of the transistor module (M3). Similarly, the source terminal of the last transistor in the transistor stack (M3') serves as the source terminal of the transistor module (M3). In addition, the source terminal of each transistor in the transistor stack (M3') is connected to the drain terminal of the next transistor in the transistor stack (M3'). The gate terminals of the transistors of the transistor stack (M3') are connected to each other and to the drain terminal of the first transistor in the transistor stack (M3').

Figure 4:
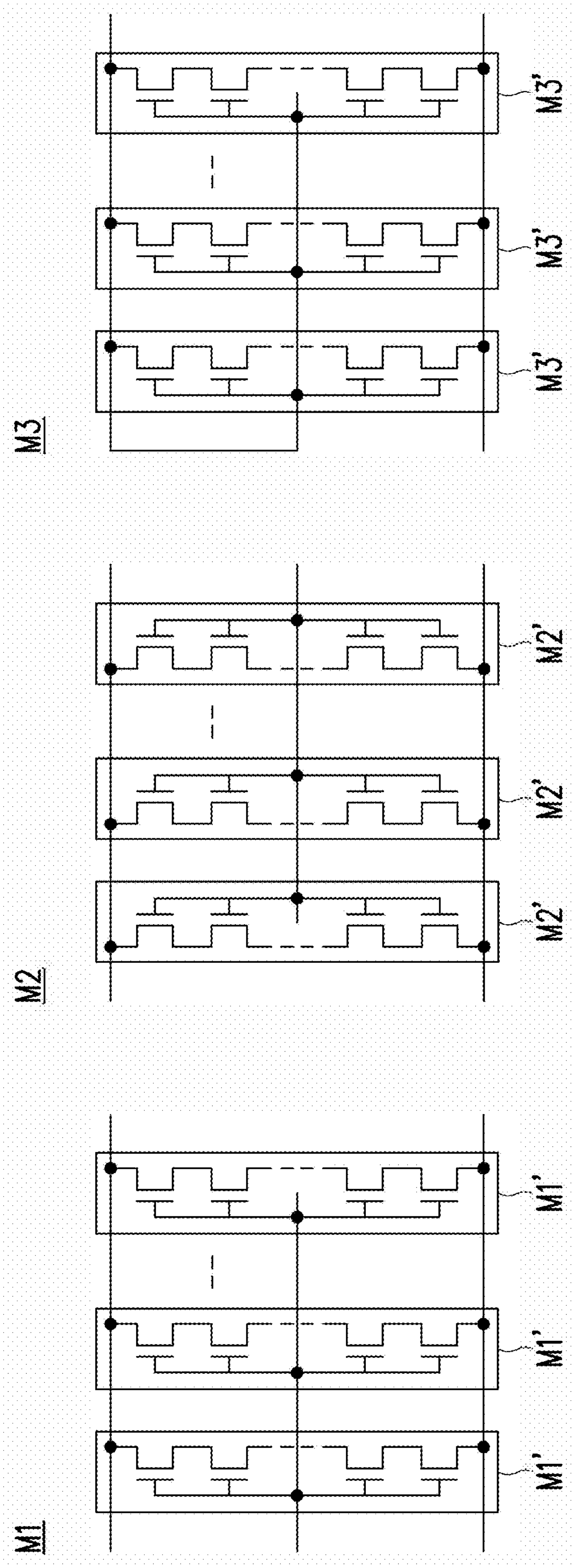
FIG. 4 is a schematic circuit diagram illustrating another exemplary transistor module of a semiconductor device in accordance with various embodiments of the present disclosure.

Although the transistor module (M1, M2, M3) is exemplified with only a single stack of transistors (M1', M2' M3'), it should be apparent that, after reading this disclosure, the transistor module (M1, M2, M3) may include one or more transistor stacks. For example, FIG. 4 is a schematic circuit diagram illustrating another exemplary transistor module (M1, M2, M3) of the semiconductor device 200 in accordance with various embodiments of the present disclosure. As illustrated in FIG. 4, the example transistor module (M1, M2, M3) includes a plurality of transistor stacks (M1', M2', M3'). The transistor stacks (M1') are connected in parallel. For example, the drain terminals of the first transistors in the transistor stacks (M1') are connected to each other. The source terminals of the last transistors in the transistor stacks (M1') are connected to each other. The gate terminals of the transistors of the transistor stacks (M1') are connected to each other.

Likewise, the transistor stacks (M2') are connected in parallel. For example, the drain terminals of the first transistors in the transistor stacks (M2') are connected to each other. The source terminals of the last transistors in the transistor stacks (M2') are connected to each other. The gate terminals of the transistors of the transistor stacks (M2') are connected to each other. In this exemplary embodiment, the number of the transistor stacks (M1') is the same as the number of the transistor stacks (M2').

Similarly, the transistor stacks (M3') are connected in parallel. For example, the drain terminals of the first transistors in the transistor stacks (M3') are connected to each other. The source terminals of the last transistors in the transistor stacks (M3') are connected to each other. The gate terminals of the transistors of the transistor stacks (M3') are connected to each other and to the drain terminals of the first transistors in the transistor stacks (M3').

Although the transistor module (M1, M2, M3) is exemplified with a predetermined number of the transistor stacks (M1', M2', M3'), it should be apparent that, after reading this disclosure, the number of the transistor stacks (M1' M2', M3') may be varied to better align the PTAT voltage/current generated by the first temperature-dependent voltage generator 110 and the CTAT voltage/current generated by the second temperature-dependent voltage generator 120 with each other. Such adjustment of the number of transistor stacks (M1' M2', M3') facilitates a more stable temperature-independent reference voltage (Vref) for the semiconductor device 200 of the present disclosure. For example, FIG. 5 is a schematic circuit diagram illustrating another exemplary transistor module (M3) of the semiconductor device 200 in accordance with various embodiments of the present disclosure.

Figure 5:
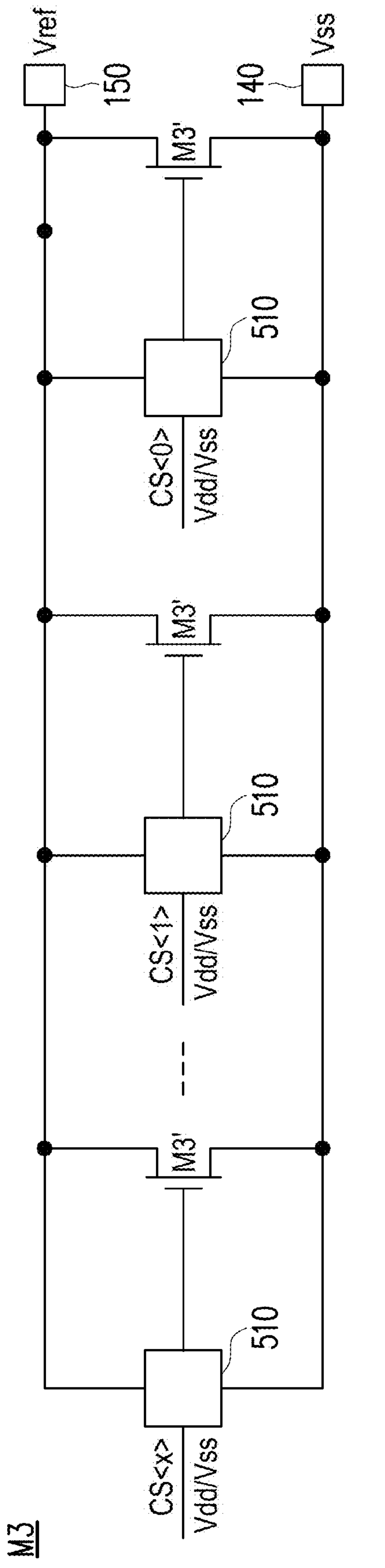
FIG. 5 is a schematic circuit diagram illustrating another exemplary transistor module of a semiconductor device in accordance with various embodiments of the present disclosure.

As illustrated in FIG. 5, the example transistor module (M3) includes a plurality of transistor stacks (M3') and a plurality of switch circuits 510. The transistor stacks (M3') are connected in parallel. For example, the transistor stack (M3') has a drain terminal connected to the reference voltage (Vref) node 150 and a source terminal connected to the second supply voltage (Vss) node 140.

The semiconductor device 200 receives a plurality of control signals (CS<x:0>) from a control signal (CS<x:0>) generator external to the semiconductor device 200. Each of the switch circuits 510 receives a respective one of the control signals (CS<x:0>), a logical "1", e.g., Vdd, or a logical "0", e.g., Vss, and connects the gate terminal of a respective one of the transistor stacks (M3') to either the reference voltage (Vref) node 150 or the second supply voltage (Vss) node 140 based on the control signal (CS<x:0>) received thereby. For example, FIGS. 6 and 7 are schematic circuit diagrams illustrating another exemplary transistor module (M3) of the semiconductor device 200 in accordance with various embodiments of the present disclosure.

Figure 6:
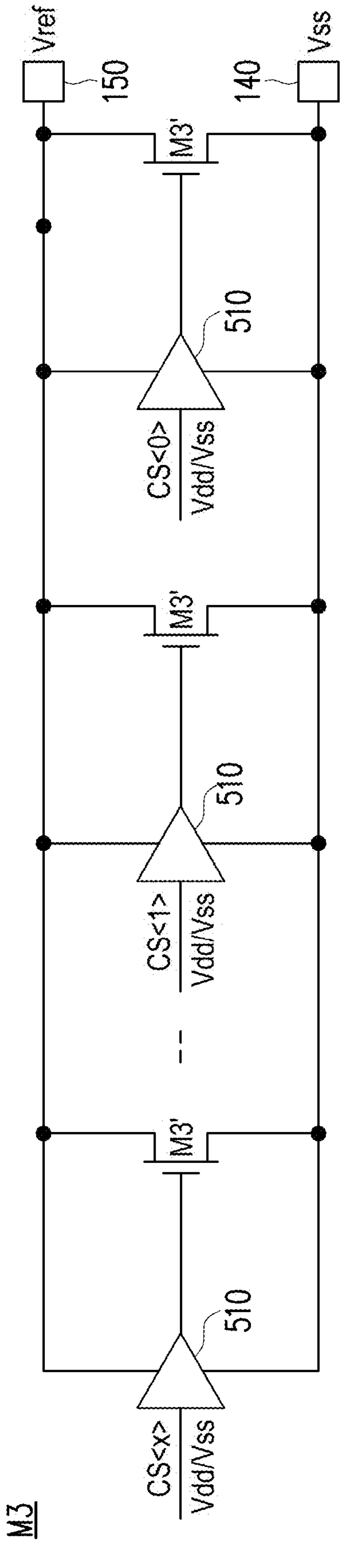
FIG. 6 is a schematic circuit diagram illustrating another exemplary transistor module of a semiconductor device in accordance with various embodiments of the present disclosure.

As illustrated in FIG. 6, the switch circuit 510 is in the form of a buffer. The buffer 510 is connected between the reference voltage (Vref) node 150 and the second supply voltage (Vss) node 140 and includes an input terminal that receives the control signal (CS<x:0>) and an output terminal connected to the gate terminal of the transistor stack (M3'). The buffer 510 includes one or more buffer stages that are controlled by the control signal (CS<x:0>) such that the one or more buffer stages connect the gate terminal of the transistor stack (M3') to the reference voltage (Vref) node 150 or the supply voltage (Vss) node. In addition, the one or more buffer stages amplify the control signal (CS<x:0>), ensuring that the control signal (CS<x:0>) is sufficient to drive operation of the buffer 510.

Figure 7:
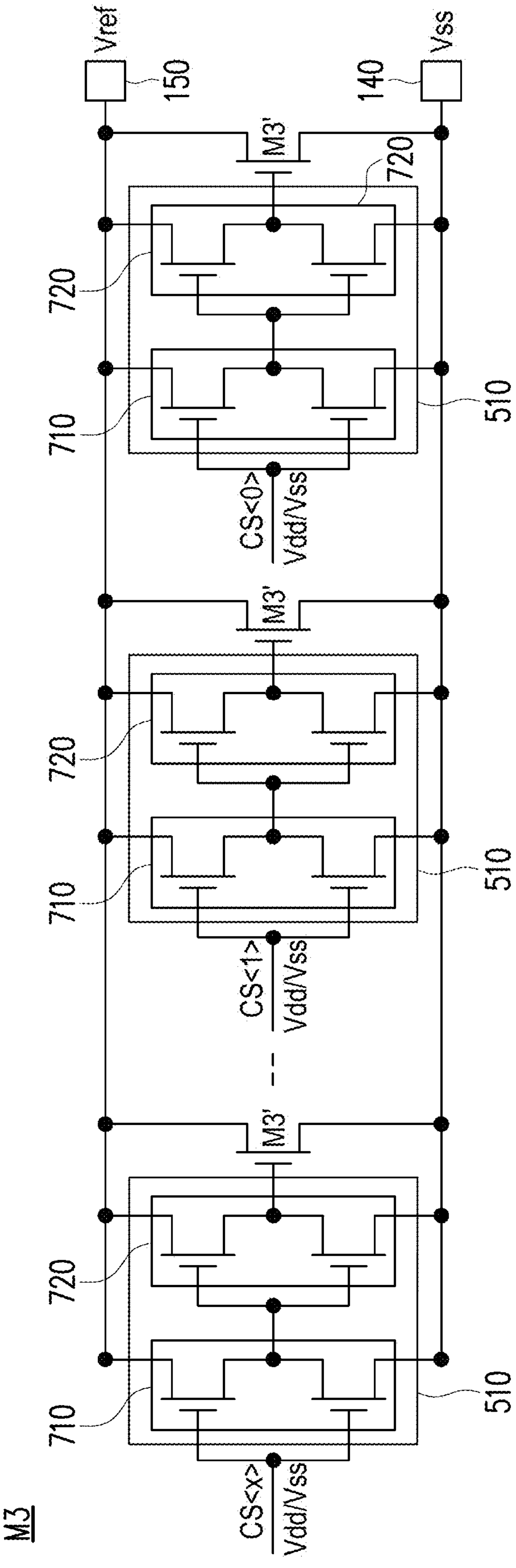
FIG. 7 is a schematic circuit diagram illustrating another exemplary transistor module of a semiconductor device in accordance with various embodiments of the present disclosure.

In this exemplary embodiment, as illustrated in FIG. 7, the buffer 510 includes a pair of inverters 710, 720, each connected between the reference voltage (Vref) node 150 and the second supply voltage (Vss) node 140. The inverter 710 has an input terminal that receives the control signal (CS<x:0>). The inverter 720 has an input terminal connected to the output terminal of the inverter 710 and an output terminal connected to the gate terminal of the transistor stack (M3'). In the exemplary embodiment, each inverter 710, 720 includes a p-type metal-oxide-semiconductor (PMOS) transistor and an n-type metal-oxide-semiconductor (NMOS) transistor.

In an exemplary operation, when the control signal (CS<x:0>) is a logical "1", e.g., Vdd, the PMOS and NMOS transistors of the inverter 710 are deactivated and activated, respectively, connecting the input terminal of the inverter 720 to the second supply voltage (Vss) node 140. This activates the PMOS transistor of the inverter 720 and substantially simultaneously deactivates the NMOS transistor of the inverter 720, connecting the gate terminal of the transistor stack (M3') to the reference voltage (Vref) node 150. This, in turn, activates the transistor stack (M3').

Conversely, when the control signal (CS<x:0>) is a logical "0", e.g., Vss, the PMOS and NMOS transistors of the inverter 710 are activated and deactivated, respectively, connecting the input terminal of the inverter 720 to the first supply voltage (Vdd) node 150. This deactivates the PMOS transistor of the inverter 720 and substantially simultaneously activates the NMOS transistor of the inverter 720, connecting the gate terminal of the transistor stack (M3') to the second supply voltage (Vss) node 140. This, in turn, deactivates the transistor stack (M3').

From the foregoing, based on the control signals (CS<x:0>), the number of activated/deactivated transistor stacks (M3') of the transistor module (M3) can be adjusted or fine-tuned.

Figure 8:
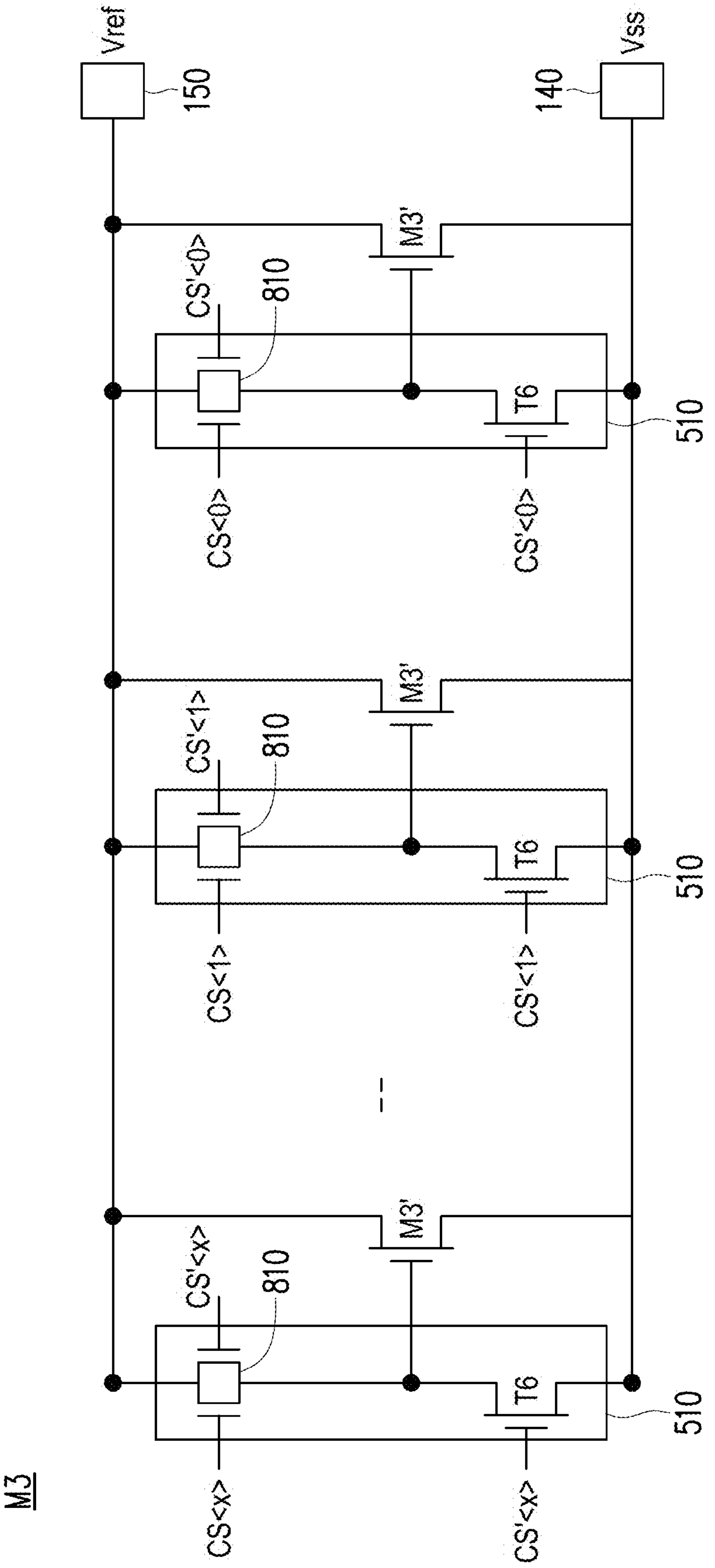
FIG. 8 is a schematic circuit diagram illustrating another exemplary transistor module of a semiconductor device in accordance with various embodiments of the present disclosure.

FIG. 8 is schematic circuit diagram illustrating another exemplary transistor module (M3) of the semiconductor device 200 in accordance with various embodiments of the present disclosure. As illustrated in FIG. 8, the switch circuit 510 includes a transmission gate 810 connected between the reference voltage (Vref) node 150 and the gate terminal of the transistor stack (M3') and a sixth transistor (T6) connected between the gate terminal of the transistor stack (M3') and the second supply voltage (Vss) node 140. The transmission gate 810 has a first input terminal that receives a control signal (CS<x:0>) and a second input terminal that receives a complement control signal (CS'<x:0>).

In this exemplary embodiment, the transistor (T6) is an NMOS transistor and has a drain terminal connected to the gate terminal of the transistor stack (M3'), a source terminal connected to the second supply voltage (Vss) node 140, and a gate terminal that receives the complement control signal (CS'<x:0>). In an alternative embodiment, the transistor (T6) is a PMOS transistor.

In an exemplary operation, when the control signal (CS<x:0>) is a logical "1", e.g., Vdd, i.e., the complement control signal (CS'<x:0>) is a logical "0", e.g., Vss, the transmission gate 810 connects the gate terminal of the transistor stack (M3') to the reference voltage (Vref) node 150. This turns the transistor stack (M3') on. At this time, the transistor (T6) is turned off.

Conversely, when the control signal (CS<x:0>) is a logical "0", e.g., Vss, i.e., the complement control signal (CS'<x:0>) is a logical "1", e.g., Vdd, the transmission gate 810 disconnects the gate terminal of the transistor stack (M3') from the reference voltage (Vref) node 150. At this time, the transistor (T6) is turned on, connecting the gate terminal of the transistor stack (M3') to the second supply voltage (Vss) node 140. This turns the transistor stack (M3') off.

From the foregoing, based on the control signals (CS<x:0>), the number of activated/deactivated transistor stacks (M3') of the transistor module (M3) can be adjusted or fine-tuned.

Figure 9:
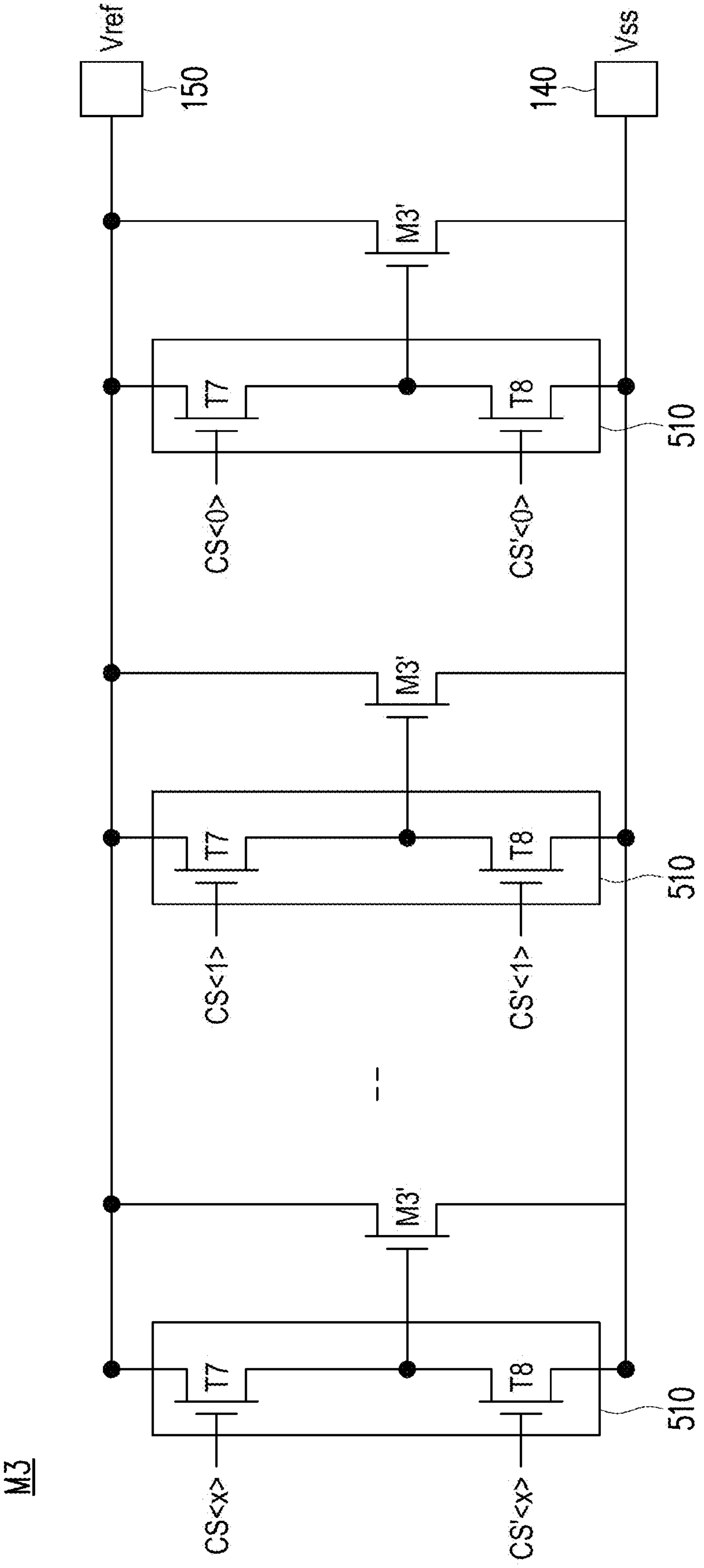
FIG. 9 is a schematic circuit diagram illustrating another exemplary transistor module of a semiconductor device in accordance with various embodiments of the present disclosure.

FIG. 9 is schematic circuit diagram illustrating another exemplary transistor module (M3) of the semiconductor device 200 in accordance with various embodiments of the present disclosure. As illustrated in FIG. 9, the switch circuit 510 includes seventh and eighth transistors (T7, T8) connected in series between the reference voltage (Vref) node 150 and the second supply voltage (Vss) node 140. In this exemplary embodiment, the seventh transistor (T7) is an NMOS transistor and has a drain terminal connected to the reference voltage (Vref) node 150, a source terminal connected to the gate terminal of the transistor stack (M3'), and a gate terminal that receives a control signal (CS<x:0>). The eighth transistor (T8) is an NMOS transistor and has a drain terminal connected to the gate terminal of the transistor stack (M3'), a source terminal connected to the second supply voltage (Vss), and a gate terminal that receives a complement control signal (CS'<x:0>). In an alternative embodiment, at least one of the first and second transistors (T7, T8) is a PMOS transistor.

In an exemplary operation, when the control signal (CS<x:0>) is a logical "1", e.g., Vdd, i.e., the complement control signal (CS'<x:0>) is a logical "0", e.g., Vss, the seventh transistor (T7) is turned on, whereas the eighth transistor (T8) is turned off. This connects the gate terminal of the transistor stack (M3') to the reference voltage (Vref) node 150 and substantially simultaneously disconnects the gate terminal of the transistor stack (M3') from the second supply voltage (Vss) node 140, turning the transistor stack (M3') on.

Conversely, when the control signal (CS<x:0>) is a logical "0", e.g., Vss, i.e., the complement control signal (CS'<x:0>) is a logical "1", e.g., Vdd, the seventh transistor (T7) is turned off, whereas the eighth transistor (T8) is turned on. This disconnects the gate terminal of the transistor stack (M3') from the reference voltage (Vref) node 150 and substantially simultaneously connects the gate terminal of the transistor stack (M3') to the second supply voltage (Vss) node 140, turning the transistor stack (M3') off.

From the foregoing, based on the control signals (CS<x:0>), the number of activated/deactivated transistor stacks (M3') of the transistor module (M3) can be adjusted or fine-tuned.

Figure 10:
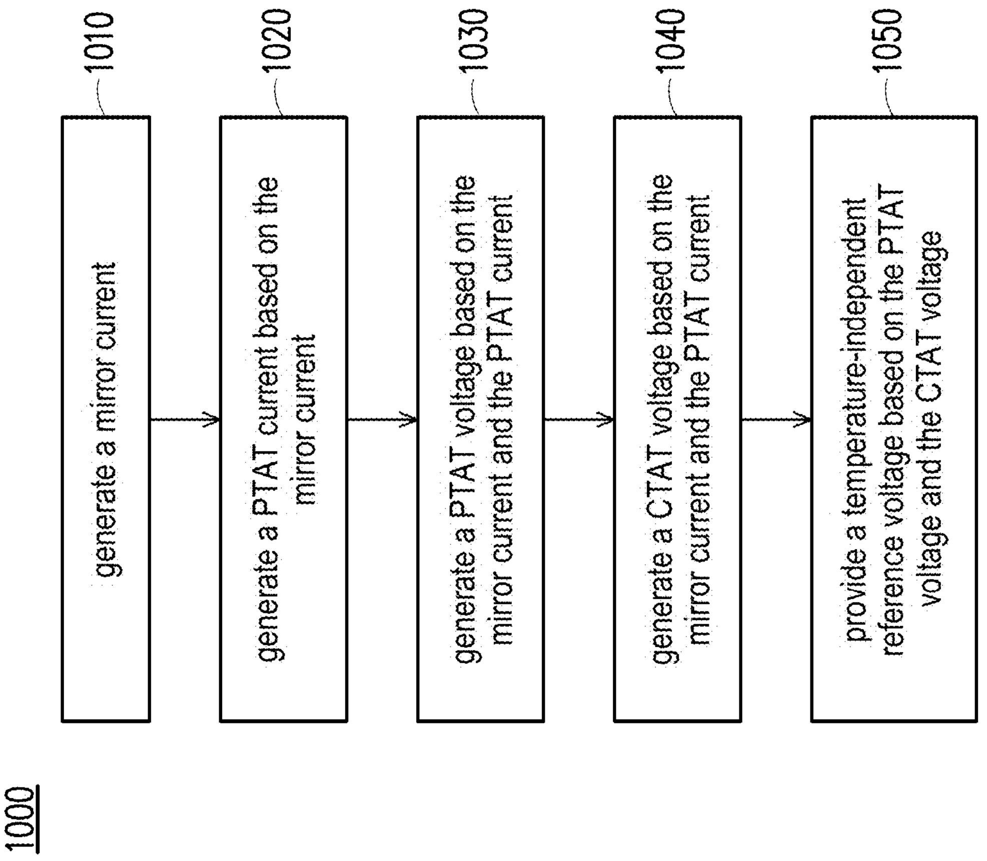
FIG. 10 is a flowchart illustrating an exemplary method for generating a temperature-independent reference voltage in accordance with various embodiments of the present disclosure.

FIG. 10 is a flowchart of an exemplary embodiment of a method 1000 for generating a temperature-independent reference voltage (Vref) in accordance with various embodiments of the present disclosure. The example method 1000 will now be described with further reference to FIGS. 2-9 for ease of understanding. It is understood that the method 1000 is applicable to structures other than those of FIGS. 2-9. Further, it is understood that additional operations can be provided before, during, and after the method 1000, and some of the operations described below can be replaced or eliminated, in an alternative embodiment of the method 1000.

In operation 1010, the current mirror circuits 210, 220 generates the mirror currents (I1-I4). In operation 1020, the resistor generates the PTAT current ($I_{PTAT}$). In operation 1030, the first temperature-dependent voltage generator 110 generates a PTAT voltage based on the mirror currents (I1-I4) and the PTAT current ($I_{PTAT}$). In this exemplary embodiment, operation 1030 includes: generating, by the first transistor module (M1), a gate-to-source voltage (Vgs1); generating, by the second transistor module (M2), a gate-to-source voltage (Vgs2), whereby a first gate-to-source voltage (Vgs1-Vgs2) substantially equal to the difference between the gate-to-source voltage (Vgs1) and the gate-to-source voltage (Vgs2) appears at the PTAT node 230. In operation 1040, the second temperature-dependent voltage generator 120 generates a CTAT voltage based on the mirror currents (I1-I4) and the PTAT current ($I_{PTAT}$). In certain exemplary embodiments, operation 1040 includes: each switch circuit 510 receiving a respective control signal (CS<x:0>); the switch circuit 510 connecting the gate terminal of the transistor stack (M3') to the reference voltage (Vref) node 150 or the second supply voltage (Vss) node 140 based on the control signal (CS<x:0>) received thereby, activating/deactivating the transistor stack (M3'), whereby the number of activated/deactivated transistor stacks (M3') are adjusted or fine-tuned; and the third transistor module (M3) generating a second gate-to-source voltage (Vgs3) that appears at the CTAT node 240. In operation 1050, the reference voltage (Vref) node provides a temperature-independent reference voltage (Vref) based on the PTAT and CTAT voltages. In this exemplary embodiment, the temperature-independent reference voltage (Vref) is substantially equal to the sum of the first gate-to-source voltage (Vgs1-Vgs2) at the PTAT node 230 and the second gate-to-source voltage (Vgs3) at the CTAT node 240.

In an embodiment, a voltage generator comprises a temperature-dependent voltage generator and a reference voltage node. The temperature-dependent voltage generator generates a voltage that increases with temperature and includes a first transistor stack and a second transistor stack. Each of the first transistor stack and the second transistor stack has a first source/drain terminal and a gate terminal connected to each other at a temperature-dependent voltage generator node. The reference voltage node is connected to a second source/drain terminal of the second transistor stack and provides a reference voltage substantially independent of temperature.

In another embodiment, a semiconductor device comprises a first temperature-dependent voltage generator, a second temperature-dependent voltage generator, and a reference voltage node. The first temperature-dependent voltage generator generates a voltage that increases with temperature and includes a first transistor module. The second temperature-dependent voltage generator generates a voltage that decreases with temperature and includes a second transistor module. The second transistor module has a source/drain terminal and a gate terminal connected to each other and to a source/drain terminal of the first transistor module. The reference voltage node is connected to the first temperature-dependent voltage generator and provides a reference voltage substantially independent of temperature.

In another embodiment, a method for generating a temperature-independent reference voltage comprises generating a first gate-to-source voltage substantially equal to a difference between a gate-to-source voltage of a first transistor module and a gate-to-source voltage of a second transistor module at a temperature-dependent voltage generator node. Each of the first and second transistor modules has a gate terminal and a first source/drain terminal connected to each other at the temperature-dependent voltage generator node. The method further comprises generating, by a third transistor module, a second gate-to-source voltage and providing, at a reference voltage node, a temperature-independent reference voltage substantially equal to a sum of the first and second gate-to-source voltages.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A voltage generator comprising:

a temperature-dependent voltage generator configured to receive a first current and a second current that is a mirror current of the first current, and to generate, based on the first and second currents, a voltage that increases with temperature, wherein the temperature-dependent voltage generator includes a first transistor stack and a second transistor stack, each of the first transistor stack and the second transistor stack has a first source/drain terminal and a gate terminal connected to each other at a temperature-dependent voltage generator node; and a reference voltage node connected to a second source/drain terminal of the second transistor stack and configured to provide a reference voltage substantially independent of temperature.

2. The voltage generator of claim 1, wherein each of the first transistor stack and the second transistor stack includes a predetermined number of transistors and the number of transistors of the first transistor stack is greater than the number of transistors of the second transistor stack.

3. The voltage generator of claim 1, wherein the voltage generator does not include a bipolar junction transistor (BJT).

4. The voltage generator of claim 1, wherein the voltage generator does not include transistors that have different threshold voltages.

5. The voltage generator of claim 1, wherein the first and second currents are proportional to each other and flow through the temperature-dependent voltage generator node from a first current mirror circuit.

6. The voltage generator of claim 5, further comprising:

a resistor; and a second current mirror circuit connected between the first current mirror circuit and the resistor and configured to generate a temperature-dependent current that is based on a mirror current of the first current mirror circuit and that flows through the resistor.

7. The voltage generator of claim 1, wherein the voltage generator has a temperature coefficient of less than 100 ppm/° C.

8. A semiconductor device comprising:

a first temperature-dependent voltage generator configured to receive a first current and a second current that is a mirror current of the first current, and to generate, based on the first and second currents, a voltage that increases with temperature, wherein a first transistor module in the first temperature-dependent voltage generator has a first source/drain terminal;

a second temperature-dependent voltage generator configured to generate a voltage that decreases with temperature and including a second transistor module having a source/drain terminal and a gate terminal connected to each other and to the first source/drain terminal of the first transistor module; and a reference voltage node connected to the first temperature-dependent voltage generator and configured to provide a reference voltage substantially independent of temperature.

9. The semiconductor device of claim 8, wherein the second transistor module includes:

a plurality of transistor stacks; and a switch circuit configured to selectively connect one or more of the plurality of transistor stacks to the reference voltage node.

10. The semiconductor device of claim 8, wherein the first temperature-dependent voltage generator further includes a third transistor module having a first source/drain terminal connected to the reference voltage node, the semiconductor device further comprising:

a first current mirror circuit configured to generate the first and second currents that are proportional to each other and that flow through a temperature-dependent voltage node, wherein:

each of the first and third transistor modules further has a second source/drain terminal and a gate terminal connected to each other at the temperature-dependent voltage node.

11. The semiconductor device of claim 10, further comprising a second current mirror circuit connected to the first current mirror circuit and including a transistor connected between the reference voltage node and a supply voltage node.

12. The semiconductor device of claim 11, further comprising a resistor connected between the second current mirror circuit and the supply voltage node.

13. The semiconductor device of claim 10, wherein:

the first transistor module includes a plurality of transistors that are connected in series and that constitute a first transistor stack;

the third transistor module includes a plurality of transistors that are connected in series and that constitute a third transistor stack; and the number of transistors of the first transistor stack is greater than the number of transistors of the third transistor stack.

14. The semiconductor device of claim 13, further comprising:

one or more first transistor stacks connected in parallel to the first transistor stack; and one or more third transistor stacks connected in parallel to the third transistor stack.

15. The semiconductor device of claim 14, wherein the number of the first transistor stacks is the same as the number of the third transistor stacks.

16. A method for generating a temperature-independent reference voltage, the method comprising:

receiving, by a first temperature-dependent voltage node, a first current and a second current that is a mirror current of the first current;

generating, based on the first and second currents, a first gate-to-source voltage substantially equal to a difference between a gate-to-source voltage of a first transistor module and a gate-to-source voltage of a second transistor module at the first temperature-dependent voltage generator node, wherein each of the first and second transistor modules has a gate terminal and a first source/drain terminal connected to each other at the first temperature-dependent voltage generator node;

generating, by a third transistor module, a second gate-to-source voltage; and providing, at a reference voltage node, a temperature-independent reference voltage substantially equal to a sum of the first and second gate-to-source voltages.

17. The method of claim 16, further comprising generating the second gate-to-source voltage at a second temperature-dependent voltage generator node that is connected to a second source/drain terminal of the first transistor module and a gate terminal and a first source/drain terminal of the third transistor module.

18. The method of claim 16, wherein the first and second currents that flow through the first temperature-dependent voltage generator node are provided from a first current mirror circuit.

19. The method of claim 18, further comprising generating, by a second current mirror circuit connected to the first current mirror circuit, a temperature-dependent current that flows through a resistor.

20. The method of claim 19, wherein the second current mirror circuit includes a transistor connected between the reference voltage node and ground.

* * * * *